F. M. Osborn
Nail Extractor,

Nº 59,059. Patented Oct. 23, 1866.

Witnesses:
Jas. A. Service

Inventor:
F. M. Osborne
Per Munn & Co.
Attys

UNITED STATES PATENT OFFICE.

F. M. OSBORN, OF DOVER PLAINS, NEW YORK.

IMPROVED TACK-EXTRACTOR.

Specification forming part of Letters Patent No. 59,059, dated October 23, 1866.

*To all whom it may concern:*

Be it known that I, F. M. OSBORN, of Dover Plains, Dutchess county, State of New York, have invented a new and Improved Tack-Extractor; and I do hereby declare that the following is a full, clear, and exact description thereof, which will enable others skilled in the art to make and use the same, reference being had to the accompanying drawings, forming part of this specification, in which—

Figure 2:
Figure 1:
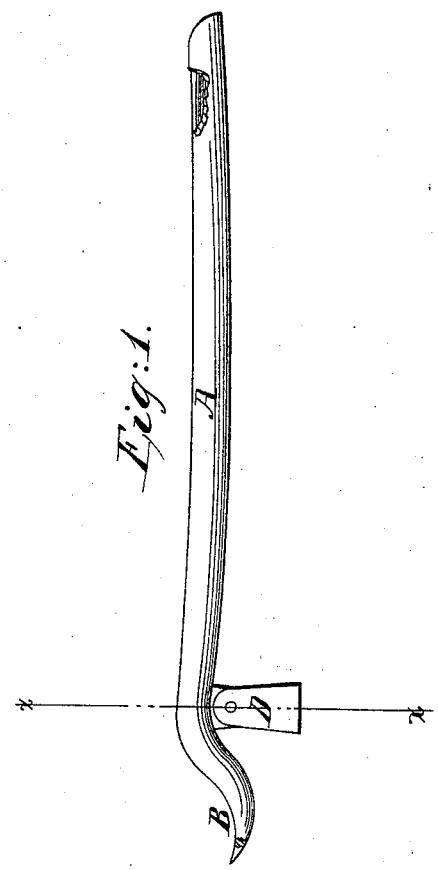

Figure 1 is a side view of the tack-extractor; and Fig. 2, a transverse vertical section taken in the plane of the line x x, Fig. 1.

Similar letters of reference indicate like parts.

The present invention relates to a novel and very useful and convenient implement for extracting or drawing out tacks and other similar fastening devices, whereby it can be accomplished with the utmost ease and rapidity, and with but little labor or trouble, as will be obvious from the following detail description thereof.

A in the drawings represents the handle of the tack-extractor, which may be made of cast-iron or any other suitable metal or material, with one end, B, bent and made of a fork shape, or with two prongs.

To the under side of the handle A, and near its bent or fork shaped end B, is hung or swiveled a prop or support, D, which, when the implement is being used, serves as a fulcrum or support for the handle, whereby great power is enabled to be brought to bear upon the head of the tack held between the pronged end of the implement, and thus the tack withdrawn or extracted with ease and with but little labor, the swiveling of the said support enabling its position to be so adjusted as to produce a greater or less amount of leverage, according as may be desired or necessary.

In lieu of so swiveling the prop or support D to the handle or lever of the implement as to be susceptible of adjustment, as above explained, it may be connected therewith so that it cannot be swung either to the right or left, or, in other words, fixed to the handle; but I deem it best to swivel it, as by that means the convenience and usefulness of the implement are much increased.

I claim as new and desire to secure by Letters Patent—

The hinged support D, in combination with the handle A, having pronged end B, substantially as described, for the purpose specified.

The above specification of my invention signed by me this 20th day of April, 1866.

F. M. OSBORN.

Witnesses:
   WM. F. MCNAMARA,
   ALBERT W. BROWN.